United States Patent [19]
Tidwell, Jr.

[11] 3,933,348
[45] Jan. 20, 1976

[54] DOUBLE PLATING WALL FRAMER

[76] Inventor: Carl E. Tidwell, Jr., 5800 Riverview Road, Mabelton, Ga. 30059

[22] Filed: Oct. 24, 1974

[21] Appl. No.: 517,456

[52] U.S. Cl. ............ 269/303; 29/200 J; 144/288 C; 269/297; 269/321 F; 269/321 S

[51] Int. Cl.$^2$ ............ B23P 19/00

[58] Field of Search ............ 269/296–299, 269/303, 321 S, 321 F; 144/288 R, 288 C; 29/200 J, 200 P

[56] References Cited

UNITED STATES PATENTS

| | | | |
|---|---|---|---|
| 1,662,438 | 3/1928 | Reinhold | 269/296 |
| 2,662,565 | 12/1953 | Le Vay | 144/288 R |
| 2,749,873 | 6/1956 | Huffman | 144/288 R |
| 3,735,464 | 5/1973 | Linzmeier et al. | 144/288 C |
| 3,752,467 | 8/1973 | Stanley | 144/288 C |

*Primary Examiner*—Al Lawrence Smith
*Assistant Examiner*—Robert C. Watson

[57] ABSTRACT

A double plating wall framer for use in assembling wall frames with a series of cross beams secured at each end to an end beam and, optionally, to an auxiliary end beam. The wall framer includes a movable frame locating member for retaining the end beams within the wall framer and allowing the wall framer to be used in assembling wall frames either with or without auxiliary end beams.

6 Claims, 3 Drawing Figures

DOUBLE PLATING WALL FRAMER

In the construction of both single and multiple unit dwellings, pre-assembled wall frames are used within the interior in the fabrication of the walls. These pre-assembled wall frames include a series of cross-beams secured at each end to an end beam, or plate. At times, the contractors require an additional, or auxiliary, end beam, or plate, secured at one or both ends of the cross beams; the provision of two end beams is known in the construction arts as "double plating". The pre-assembled wall frames are secured within the dwelling, and after all electrical and utility work is completed, the wall frames are covered with a suitable material, such as sheets of wall board, to complete the fabrication of the walls.

Because of the cost of labor and the number and variety of wall frames needed in the construction of a dwelling, attempts have been made to mechanize the assembly of wall frames. Wall framers which can either be permanently secured within a plant or moved to various construction sites are now used in assembling wall frames. However, none of the existing wall framers provide for the easy assembly of a wall frame which has an additional, or auxiliary, end beam secured at the end of the cross-beams. Existing wall framers have frame locating members attached thereto and projecting upwardly therefrom which define the channels into which the cross-beams and end beams are placed during the assembly of a wall frame. It is difficult to secure an auxiliary end beam to the assembled wall frame while the assembled wall frame is within the wall framer because the frame locating members along the outer edge of the end beams prevent close contact between the auxiliary end beam and the end beam within the assembled wall frame. If an auxiliary end beam is secured to an assembled wall frame while the assembled wall frame is within the wall framer, it is very difficult to remove the double plated wall frame from the wall framer because of the frame locating members which are pinched between the end beam and the auxiliary end beam.

SUMMARY OF THE INVENTION

Briefly described, the present invention is directed to a wall framer which can be used in assembling wall frames in which a series of cross beams are secured at each end to an end beam and, optionally, to an additional, or auxiliary, end beam. The wall framer includes support structure for the beams, a number of movable frame locating members for retaining one of the end beams within the wall framer and in contact with the cross beams, and a number of additional frame locating members for retaining an auxiliary end beam within the wall framer. The movable frame locating members are arranged so that, when an auxiliary end beam is inserted into the wall framer and into contact with the end beam already present, the movable frame locating members are depressed just below the end beam support surface and support the auxiliary end beam in proper alignment with the end beam already present.

Thus, it is an object of the present invention to provide improved wall framing apparatus.

It is another object of the present invention to provide a wall framer which can be used to easily assemble wall frames which either do or do not have an auxiliary end beam secured at the end of the cross beams.

Other objects, features, and advantages of the present invention will become apparent from reading the following specification, when taken in conjunction with the accompanying drawing, which describes an illustrative embodiment of the invention.

DESCRIPTION OF THE PREFERRED EMBODIMENT

Figure 1:
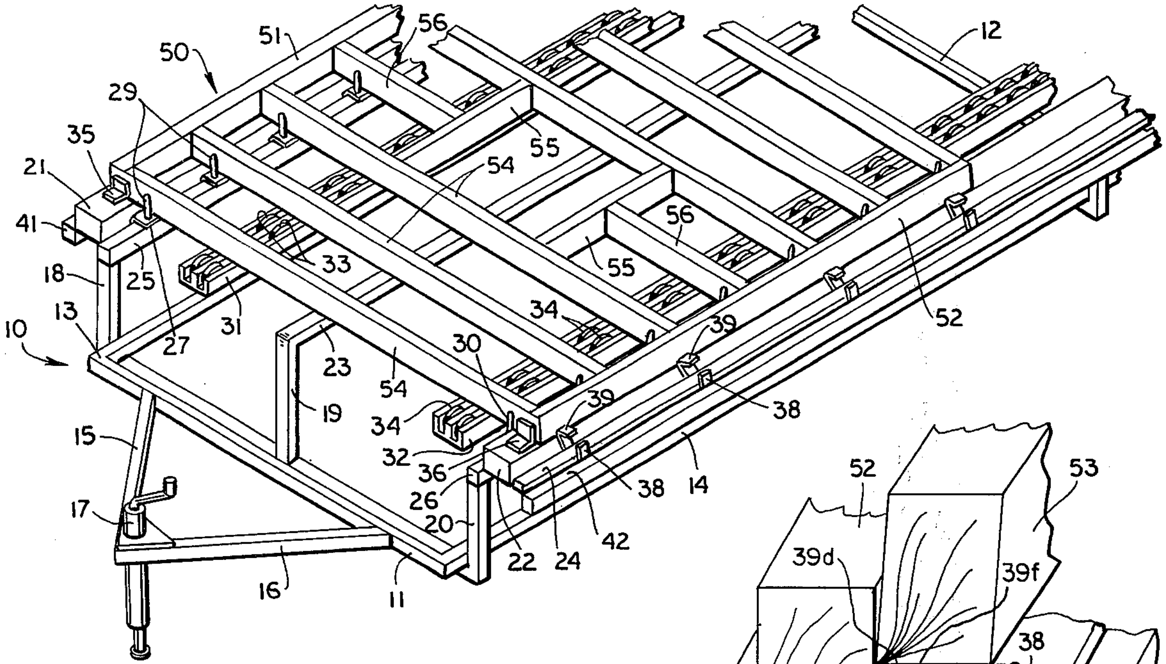
FIG. 1 is a pictorial view of a wall framer of an illustrative embodiment of the present invention as it would appear while retaining the cross beams and end beams during the assembly of a wall frame.

Referring now in more detail to the drawing, in which like numerals indicate like parts throughout the several views, FIG. 1 shows a double plating wall framer 10 having therein an assembled wall frame 50. Wall framer 10 has a generally rectangular base defined by front cross bar 11, rear cross bar 12, left elongate bar 13, and right elongate bar 14. Extending outwardly at an angle from front bar 11 are left connecting bar 15 and right connecting bar 16. These two bars are connected together at the ends and a vertically adjustable jack 17 extends downward from the point where the two bars are connected. Jack 17 is used to support the wall framer front and to adjust the level of the wall framer front relative to the wall framer rear. Preferably, the wall framer base is an integral part of a mobile trailer with wheels so that the wall framer can be transported from one construction site to another with a minimum of effort. Of course, the wall framer base can be permanently secured to the floor of a wall framer construction plant in any conventional manner. If the wall framer base is permanently secured to the floor of a construction plant, jack 17 would not be needed.

Extending upwardly from left elongate bar 13 is left front framing table support 18, extending upwardly from the middle of front cross bar 11 is middle front framing table support 19, and extending upwardly from right elongate bar 14 is right front framing table support 20. Not shown, but extending upwardly along the length of wall framer 10 from left elongate bar 13 and right elongate bar 14 are additional left framing table supports and right framing table supports, respectively. Also not shown is an additional middle framing table support extending upwardly from the middle of rear cross bar 12.

The framing table includes left table strut 21 supported by the left framing table supports, middle table strut 23 supported by the middle framing table supports and right table strut 22 and right auxiliary strut 24 supported by the right framing table supports. Each of left table strut 21, middle table strut 23, and right table strut 22 extend along the length of wall framer 10, and together the top surfaces of these table struts form an approximately planar surface. Preferably, either left table strut 21 and the corresponding left framing table supports or right table strut 22 and the corresponding right framing table supports are laterally adjustable in order to provide various table widths for assembling various sizes of wall frames.

Figure 3:
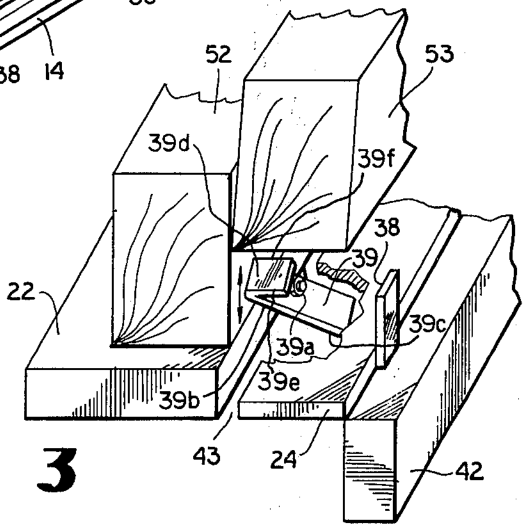
FIG. 3 is a view of a movable auxiliary flange of the present invention as it would appear during the insertion of an auxiliary end beam into the wall framer.
Figure 2:
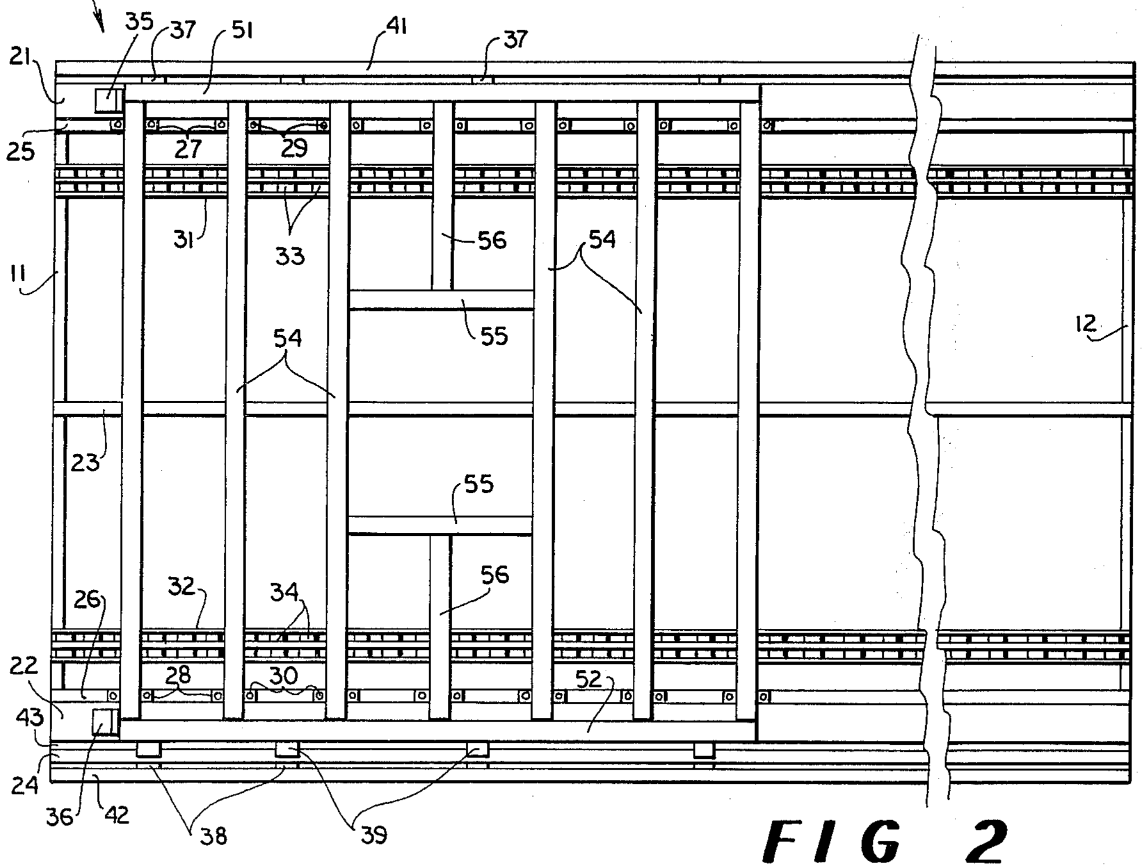
FIG. 2 is a top view of the wall framer of FIG. 1.

Secured to right table strut 22 at a spaced distance defined by right auxiliary flange opening 43 is right auxiliary strut 24. The top surface of right auxiliary strut 24 is spaced a predetermined distance below the top surface of right table strut 22. Attached to a series of pivots 39*a* on right table strut 22 along the length thereof and within right auxiliary flange opening 43 are right auxiliary side flanges 39. These flanges have portions 39*b* extending above the top surface of right table strut 22 and act to retain right end beam 52 in contact with the ends of cross beams 54 on the framing table during assembly of wall frame 50. As depicted in FIG. 3, right auxiliary side flanges 39 are L-shaped with one leg 39*c* extending downwardly at an angle from the vertical into right auxiliary flange opening 43 and movable rotatably within a vertical plane and one leg 39*d* extending outwardly and over right auxiliary strut 24. The extension of the leg 39*c* downwardly is accomplished by pivotally attaching right auxiliary flanges 39 to right auxiliary strut 24 at a point on the flanges between the center of gravity of the flanges and the intersection of the two legs 39*c* and 39*d* of the flanges. The extension of the leg 39*d* at an angle from the vertical is accomplished by pivotally attaching right auxiliary flanges 39 through a point on the leg 39*c* extending downward which is offset from the longitudinal axis of the downwardly-extending leg. The point of attachment of right auxiliary side flanges 39 on right table strut 22 and the predetermined distance between the top surfaces of right table strut 22 and right auxiliary strut 24 are such that, when each right auxiliary side flange 39 is pivoted and one edge 39*e* of the outwardly-extending leg 39*d* of each right auxiliary side flange 39 contacts right auxiliary strut 24, the other edge 39*f* of the outwardly-extending leg is in the same plane as the top surface of right table strut 22.

Although not depicted in the drawing, it is within the scope of this invention to provide a left auxiliary strut with left auxiliary side flanges. In this manner wall frames could be assembled with double end beams attached at each end of the cross beams.

Attached along the outer edge of right auxiliary strut 24 and extending upwardly above the top surface of right auxiliary strut 24 is a series of right side flanges 38. These flanges act to keep right auxiliary end beam 53 in direct contact with right end beam 52 during the assembly of wall frame 50. Similarly, attached along the outer edge of left table strut 21 is a series of left side flanges 37. These flanges act to keep left end beam 51 in direct contact with the ends of cross beams 54 during the assembly of wall frame 50.

Left end flange 35 and right end flange 36 are secured to the top surfaces of left table strut 21 and right table strut 22, respectively, very near the front of wall framer 10. Left end flange 35 keeps left end beam 51 and the cross beam 54 nearest the front of wall framer 10 in position during assembly. Similarly, right end flange 36 keeps right end beam 52 and the cross beam 54 nearest the front of wall framer 10 in position.

Extending upwardly through the plane of the framing table are left retaining pins 29 and right retaining pins 30. Left retaining pins 29 are mounted on left pin supports 27 which are slidable within left pin channel 25. Right retaining pins 30 are mounted on right pin supports 28 which are slidable within right pin channel 26. During the assembly of wall frame 50 the pins are positioned so that holding each cross beam 54 in position on the framing table are a pair of left retaining pins 29 and a pair of right retaining pins 30. By having the retaining pins slidable along the length of the framing table, various spacings between cross beams 54 and the use of various widths of cross beams 54 can be achieved during the assembly of a wall frame 50.

Attached along the length of left table strut 21 at a position just outwardly from and below left table strut 21 is left nail gun support 41. Left nail gun support 41 acts as a guide track for a nail gun (not shown) removably attachable to left nail gun support 41. The nail gun, which can be pneumatically operated, is used to project nails through left end beam 51 and into the ends of cross beams 54. There is a similar right nail gun support 42 attached to right auxiliary strut 24 for use in nailing right end beam 52 and right auxiliary end beam 53 to the ends of cross beams 54.

Extending the length of wall framer 10 just below the framing table are vertically adjustable left guide channel 31 containing a series of left rollers 33 and right guide channel 32 containing a series of right rollers 34. After wall frame 50 is assembled, left guide channel 31 and right guide channel 32 are raised, lifting wall frame 50 from the framing table. Supported only by left rollers 33 and right rollers 34, wall frame 50 is easily guided for removal from wall frame 10.

In use, left retaining pins 29 and right retaining pins 30 are positioned along left pin channel 25 and right pin channel 26, respectively, in accordance with the width of cross beams 54 to be used and the desired spacing between cross beams 54 in the assembled wall frame 50. Left end beam 51 is positioned on left table strut 21 such that the end of left end beam 51 is in contact with left end flange 35 and the outer edge of left end beam 51 is in contact with left side flanges 37. Right end beam 52 is then positioned on right table strut 22 with the end of right end beam 52 in contact with right end flange 36 and the outer edge of right end beam 52 in contact with right auxiliary side flanges 39. If a double plated wall frame is required, a right auxiliary end beam 53 is inserted between the outer edge of right end beam 52 and right side flanges 38. Right auxiliary end beam 53 contacts leg portion 39*d* of right auxiliary side flanges 39, causing right auxiliary side flanges 39 to pivot. The outwardly extending leg of right auxiliary side flanges 39 moves downward until edge 39*e* comes into contact with right auxiliary strut 24 and the downwardly extending leg portions 39*b* of right auxiliary side flanges 39 moves below the framing surface within right auxiliary flange opening 43. Right auxiliary side flanges 39 pivot until below the framing surface and in contact with right auxiliary strut 24 and edges 39*f* of the right auxiliary side flanges 39 support right auxiliary end beam 53 in proper alignment with right end beam 52. If a double plated wall frame is not needed, then the step of positioning right auxiliary end beam 53 on the framing table is omitted. Next, cross beams 54 are positioned between left end beam 51 and right end beam 52 within the pairs of left retaining pins 29 and right retaining pins 30. A nail gun is then attached to left nail gun support 41 and nails are projected through left end beam 51 and into the ends of each cross beam 54 as the nail gun is moved along the length of wall framer 10. Another nail gun is attached to right nail gun support 42 and nails are projected through right auxiliary end beam 53, if present, right end beam 52, and into the ends of each cross beam 54. Left guide channel 31 and right guide channel 32 are then raised to lift the wall frame 50 off the framing table. Wall frame 50 is then pushed along left rollers 33 and right rollers 34 to the end of wall framer 10 where wall frame 50 is removed.

The window formed by window cross beams 56 and window beams 55 can be added either while wall frame 50 is on wall framer 10 or after removal therefrom. Because of the many various types and sizes of windows, the window-forming step is normally done by hand using conventional procedures.

While this invention has been described in detail, with particular reference to preferred embodiments thereof, it will be understood that variations and modifications can be effected within the spirit and scope of the invention as described in the appended claims.

I claim:

1. Apparatus for supporting components of a frame structure, comprising:

first means defining positions for receiving a plurality of structural members in predetermined certain relation;

second means defining a position for receiving a second structural member in predetermined certain position adjacent at least some of said plural structural members;

said second means including first locating means against which a side surface of such second structural member is abutted to be in said certain position;

a second locating means mounted in spaced apart relation with said first locating means to provide abutment for a third structural member optionally positioned alongside and contiguous to said second structural member; and means operatively associated with said first locating means and normally operative to dispose said first locating means into a first position for said abutment with a second structural member and selectively operative to displace said first locating means from said first position in response to placement of a third structural member in abutment with said second locating means, so that the position of said third structural member is defined by abutment with said second locating means and by contiguity with said second structural member.

2. Apparatus as in claim 1, wherein:

said second means includes a support member for supporting said second structural member;

said first locating means comprises a plurality of locating members each having an abutment surface extending outwardly from said support member to define the positioning for such second structural member; and said locating members having a support element extending from said abutment surface in a direction toward said second locating means to provide a support surface for placement of such third structural member.

3. Apparatus as in claim 2, wherein each of said locating members normally assumes said first position and is selectively displaceable to a second position whereat said abutment surface is withdrawn from said outward extent, and each of said locating means includes means defining said second position whereat said support elements of said second members define a support surface for such third structural member which is substantially level with said support surface of said second support means.

4. Apparatus as in claim 2, wherein said means operatively associated with said first locating means includes means which normally urges each of said locating member into said first position and which is yieldable to allow said locating members to be displaced to a second position wherein said abutment surface is withdrawn from said outward extent.

5. Apparatus as in claim 4, wherein each of said locating members has a predetermined center of gravity, and each of said locating members is pivotally supported relative to said center of gravity to gravitationally assume said first position.

6. Apparatus as in claim 2, wherein each of said locating members is normally disposed in said first position with said abutment surface extending outwardly, and said locating members are operative to move to said second position in response to placement of such third structural member onto said support element.

* * * * *